US006938216B1

(12) United States Patent
Ishisaki (10) Patent No.: US 6,938,216 B1
(45) Date of Patent: Aug. 30, 2005

(54) MENU SYSTEM REQUIRING REDUCED USER MANIPULATION OF AN INPUT DEVICE (75) Inventor: Wataru Ishisaki, Toyama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/384,073

(22) Filed: Aug. 26, 1999

(30) Foreign Application Priority Data

Feb. 12, 1999 (JP) .................................. 11-034154

(51) Int. Cl.$^7$ ............................................. G09G 5/00
(52) U.S. Cl. ...................................... 715/817; 715/862
(58) Field of Search ............................... 345/710, 831, 345/829–830, 711–712, 856–862, 853–855, 345/158, 162, 160, 159, 810–813, 817–820

(56) References Cited

U.S. PATENT DOCUMENTS

| 5,251,125 | A | * | 10/1993 | Karnowski et al. ......... 345/812 |
| 5,388,198 | A | * | 2/1995 | Layman et al. ............. 345/811 |
| 5,694,150 | A | * | 12/1997 | Sigona et al. ................ 345/859 |
| 5,736,984 | A | * | 4/1998 | Jellinek et al. ............. 345/710 |
| 5,801,692 | A | * | 9/1998 | Muzio et al. ................ 345/859 |
| 5,912,664 | A | * | 6/1999 | Eick et al. ................... 345/810 |
| 5,982,351 | A | * | 11/1999 | White et al. ................. 345/831 |
| 6,031,521 | A | * | 2/2000 | Luzzatto ...................... 345/157 |
| 6,282,362 | B1 | * | 8/2001 | Murphy et al. ............... 386/46 |
| 6,493,006 | B1 | * | 12/2002 | Gourdol et al. ............. 715/825 |
| 6,868,527 | B2 | * | 3/2005 | Marler et al. ................ 715/817 |

FOREIGN PATENT DOCUMENTS

| JP | 5298049 | 11/1993 |
| JP | 10333860 | 12/1998 |

OTHER PUBLICATIONS

Cowart, *Mastering Windows 3.1*, pp. 21-31, 868, 1993.*
Microsoft Press, Computer Dictionary, Third Edition, 1997, p. 412.*

* cited by examiner

*Primary Examiner*—Steven P. Sax
(74) *Attorney, Agent, or Firm*—Greer, Burns & Crain, Ltd.

(57) ABSTRACT

A graphical user interface (GUI) for a computer system reduces the amount of manipulation of an input device required in accessing a selected item on a menu. The GUI displays a selected menu on the display screen on the basis of the number of consecutive actuations of the input device, such as a mouse button, in a predetermined time interval, or a duration time of an actuation of the input device, such as holding a mouse button down for a period of time. Menus in a predetermined sequence of menus can be selected, or a single menu can be divided into two or more parts which are then separately selected by consecutive actuations of the input device, or continuous actuation of the input device for a predetermined period of time.

12 Claims, 10 Drawing Sheets

```
#include "popup.h"  (1601)

BEGIN (1610)
    MENUITEM "&undo", IDM_UNDO (1620)
        BEGIN
        ..........  } 1621
        END
    MENUITEM "&repeat", IDM_REPEAT (1622)
    MENUITEM SEPARATOR (1623)
    MENUITEM "&cut", IDM_CUT (1624)
    MENUITEM "©",IDM_COPY (1625)
    MENUITEM "&paste",IDM_PASTE (1626)
    MENUITEM SEPARATOR (1627)
    MENUITEM "&delete",IDM_DELETE (1628)
END (1611)
```

```
undo, 0x1001,
repeat, 0x1002,
,
cut, 0x1003,
copy, 0x1004,
paste, 0x1005,
,
delete, 0x1006
```

1710

MENU SYSTEM REQUIRING REDUCED USER MANIPULATION OF AN INPUT DEVICE

BACKGROUND OF THE INVENTION

The present invention generally relates to an improved graphical user interface of a computer system which reduces the amount of physical manipulation of an input device. More particularly, the present invention relates to an improved graphical user interface for displaying one of several menus or selecting one of several menu items on the basis of a consecutive number of times an input device is actuated in a given time span. The present invention further relates to an improved graphical user interface for displaying one of several menus or selecting one of several menu items on the basis of the amount of time the input device is continually actuated.

As used throughout this disclosure, the terms "desktop" and GUI are used interchangeably, and refer to a graphical user interface display on a video screen of a computer. The term "input device" refers to a device such as a keyboard, mouse, pointing device, or the like for giving a certain input to the computer. The typical pointing device includes a track panel, track point, track ball stylus pen or the like.

Moreover, as used in this disclosure, the term "event" refers to an interrupt generated in response to a particular manipulation of an input device. For example, an event may be triggered by clicking on one of the mouse buttons, actuating a key on a keyboard, or manipulation of a stylus pen.

Still further, the term "menu" includes a pull-down menu, pull-up menu, pop-up menu, cascade menu, multiple hierarchical menu, or the like. Notably, when the software of the present invention is applied to the manipulation of a menu bar, an improved pull-down menu or pull-up menu is obtained.

Figure 3:
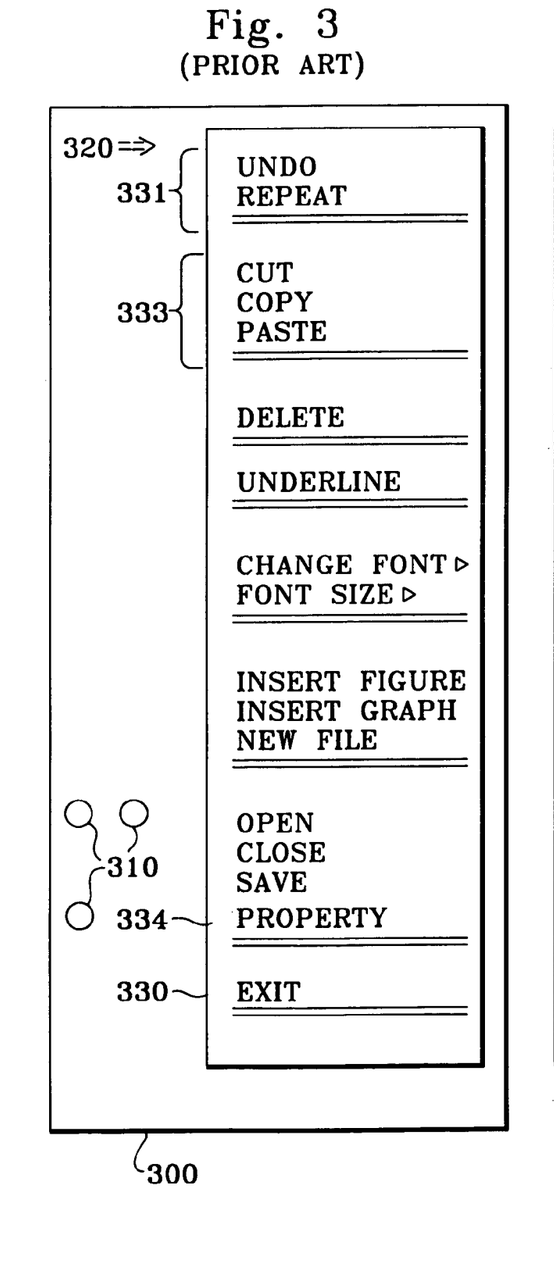
FIG. 3 is a first example of a conventional graphical user interface.

A conventional GUI 300 is illustrated in FIG. 3. The GUI 300 includes icons 310 indicating objects such as application programs, a cursor 320 of a pointing device, and a pop-up menu 330. The pop-up menu 330 includes several selectable commands, which are sometimes grouped, as in menu groups 331 and 333. This type of GUI is typically offered by an operating system, e.g., the MS Windows Operating System (Windows is a registered trademark of Microsoft Corporation). Alternatively, such GUI may be offered by various application program windows, e.g., Xwindows system (Xwindow is a registered trademark of XOpen Limited).

According to conventional MS Windows protocol, a pop-up menu is triggered within the operating system by actuating an input device, such as a mouse, on a non-display area or on an object. The term "object" refers to an icon or the like in an area of a desktop. The term "non-display" area refers to a region of the desktop where nothing is displayed. A different pop-up menu may be displayed depending on whether an object or a non-display area is selected.

By manner of illustration, FIG. 3 shows the cursor 320 positioned on a non-display area. The pop-up menu 330 could have been triggered by, for example, clicking once on a right mouse button. Similarly, in most applications running under the standard MS Windows protocol, a pop-up menu is triggered from within the application by actuating the input device on a non-display area or on an object within the window.

The pop-up menu 330 contains a number of commands or attributes which may be executed or adjusted by selecting the appropriate item. Notably, a user manipulates an input device such as a mouse or scroll key on a keyboard to move the cursor 320 to a desired item on the menu. When the user actuates the input device in a predetermined manner, a command corresponding to the relevant item is executed. Thus, the use of the menu tree eliminates the need to input a command from the keyboard.

Figure 4:
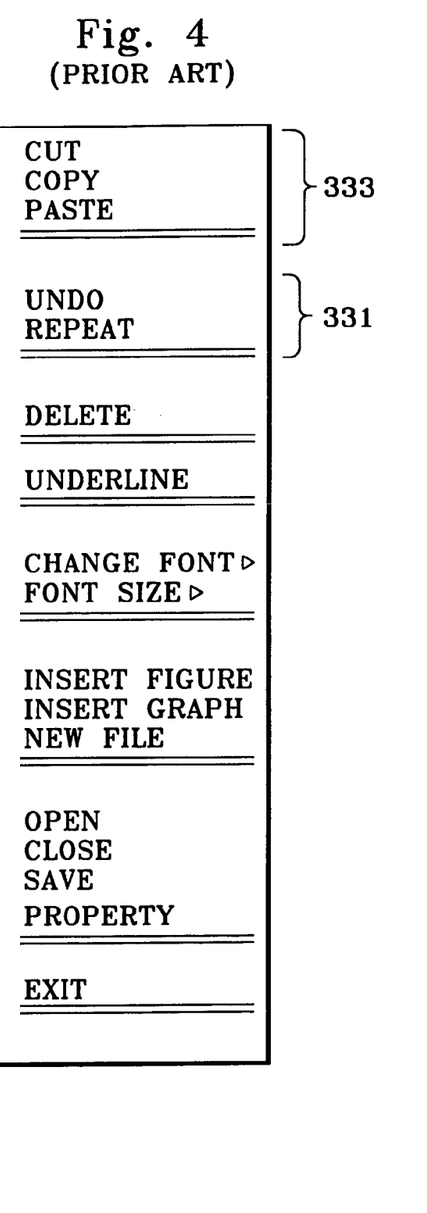
FIG. 4 is a second example of a conventional graphical user interface.

Japanese Published Unexamined Patent Application No. HEI 10-333860 discloses an improvement to the above-described GUI which allows the user (as opposed to the program developer) to determine the ordering of the displayed items. For example, a user may opt to position frequently executed commands toward the top of the menu, thereby reducing the amount of manipulation of the input device. FIG. 4 illustrates the pop-up menu 330 where the relative sequence the first group of commands 331 is interchanged with the second group of commands 333.

Figure 5:
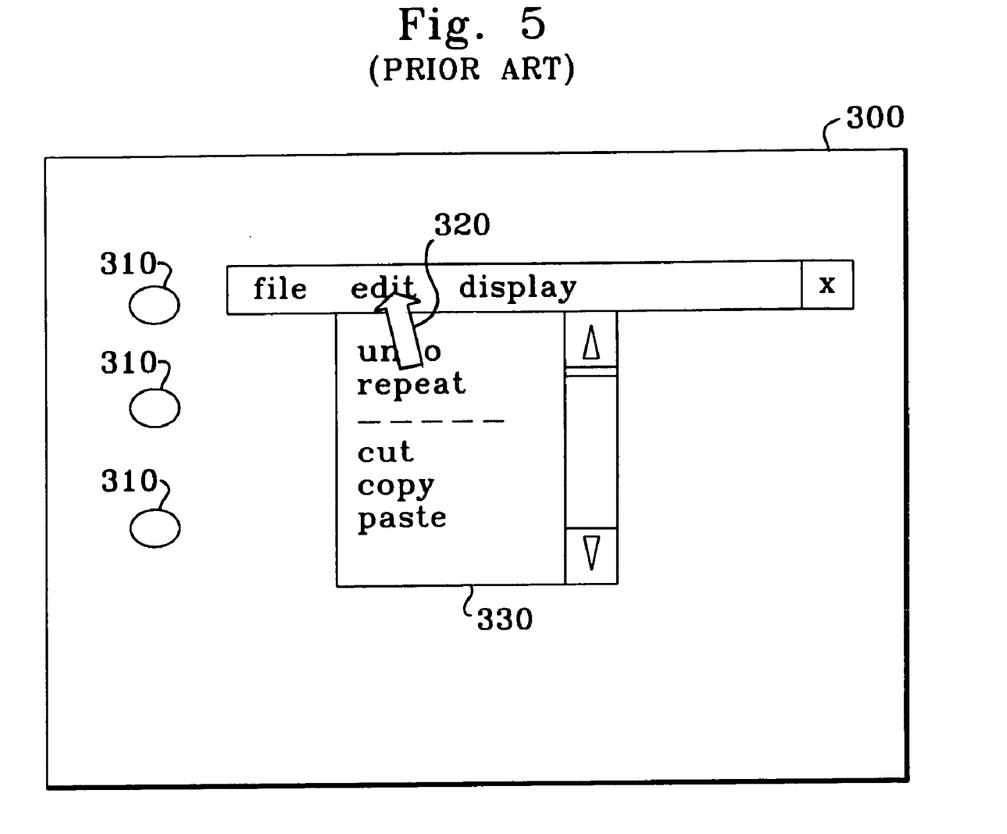
FIG. 5 is a third example of a conventional graphical user interface.

Another improvement to the above described GUI is disclosed in Japanese Published Unexamined Patent Application No. HEI 5-298049. As shown in FIG. 5, this improvement provides a scroll bar 350 which facilitates rapid scrolling of the menu 330.

However, each of the above-described GUI's suffers from a problem wherein a relatively large amount of manipulation of the input device is required to select a command located towards the bottom of the menu. This problem is exacerbated as the number of items contained in the menu increases.

It is therefore an object of the present invention to provide an improved GUI which reduces the amount of manipulation of the input device required to select a command. It is a further object of the present invention to provide an improved GUI which displays a selected menu on the basis of the number of consecutive actuations of an input device within a predefined time.

Yet another object of the present invention to provide an improved GUI which displays a selected menu on the basis of the actuation time of an input device.

Still another object of the present invention is to provide in the above-mentioned computer system a menu item manager for selecting and arranging items displayed in each one of a plurality of menus.

A still further object of the present invention is to provide a computer readable storage medium storing a computer program for displaying a menu on the display screen of a computer on the basis of manipulation of an input device, wherein the computer program includes a first routine responsive to an event alert message from an operating system of a computer upon a particular manipulation of an input device, and a second routine for displaying a selected menu on the basis of at least one of: the number of event alert messages received within a predetermined time interval, and a duration time corresponding to a predetermined actuation of the input device calculated as a difference between receipt of a first event alert message and receipt of a second event alert message.

SUMMARY OF THE INVENTION

According to one embodiment of the present invention, a graphical user interface is provided for displaying a menu on a display screen on the basis of a predefined manipulation of an input device. The graphical user interface includes an input device monitor for monitoring at least one of a location and an actuation state of the input device. A display controller displays a selected menu from among a plurality of menus on the basis of one of: a number of consecutive actuations of an input device in a predetermined time interval, and a duration time of a predetermined actuation of the input device. The aforementioned duration time refers to a situation in which a user continuously depresses or actuates a pushbutton or the like on the input device, i.e., the user does not release the pushbutton for a period of time (duration time).

The above-mentioned graphical user interface may be enhanced by further providing a menu item manager for selecting and arranging items displayed in each one of a plurality of menus.

According to one aspect of the above-mentioned graphical user interface, the display controller tracks the coordinates of the input device and resets the counter/timer if the coordinates of a second or subsequent actuation do not fall within a predefined area.

According to another embodiment of the present invention, a computer system is provided for displaying a selected menu on a display screen on the basis of manipulation of an input device. The computer system includes an event alert receiver for receiving messages from an operating system alerting the occurrence of a particular manipulation of an input device. A display controller displays a selected menu on the basis of one of: a duration time of the particular manipulation calculated as a time difference between receipt of a first alert message and receipt of a second alert message, and a number of event alert messages received in a predetermined time interval.

The above-mentioned computer system may be enhanced by further providing a menu item manager for selecting and arranging items displayed in each one of a plurality of menus.

According to one feature of the above-mentioned computer the display controller tracks the coordinates of the input device and resets the counter/timer if the coordinates of a second or subsequent actuation does not fall within a predefined area.

According to another embodiment the graphical user interface of the present invention is embodied in software including first and second routines. The first routine is responsive to an event alert message from an operating system which is transmitted upon a particular manipulation of an input device. The second routine communicates with the first routine and displays a selected menu on the basis of one of: the number of event alert message received within a predetermined time interval and a duration time of a predetermined actuation of the input device calculated as a difference between receipt of a first event alert message and receipt of a second event alert message.

BRIEF DESCRIPTION OF THE DRAWINGS

The present invention is described herein with reference to the drawings wherein.

DESCRIPTION OF THE PREFERRED EMBODIMENTS

The GUI of the present invention is realized using software which may be written in any program language such as the C programming language or the like. Preferably, though, the software is written using an object oriented program language such as C++, Smalltalk, or the like. The software of the present invention can be operated on various kinds of operating systems (OS) capable of supporting a graphical user interface (GUI), e.g., MS Windows.

The GUI of the present invention can be implemented within either or both of an operating system or an application program. Predefined manipulation of the input device on the non-display area/object on the desktop will cause a graphical user interface, i.e., a menu to be displayed.

Figure 1:
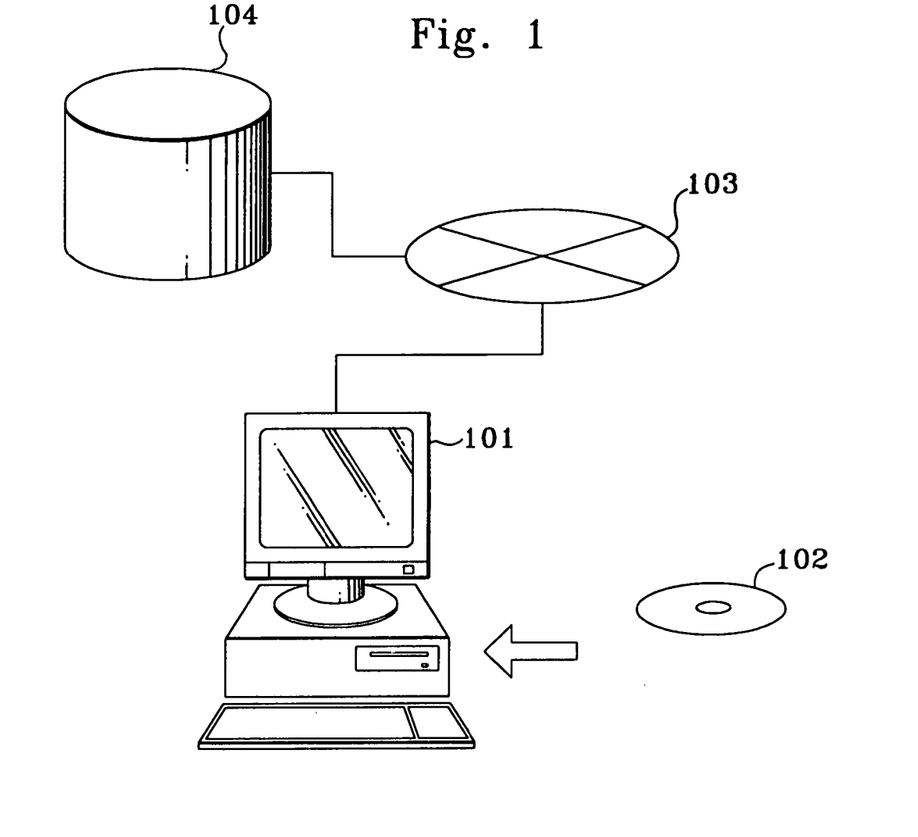
FIG. 1 is diagram of a computer system used to execute the software of the present invention.

FIG. 1 illustrates a typical computer system 101 used to execute the software of the present invention. The computer system 101 includes a non-volatile storage medium 102 on which the software resides. The storage medium 102 may include a fixed Winchester type medium and/or a removable storage medium such as a floppy disk, CD ROM or the like. Moreover, the software may be downloaded from a remote device 104 over a network 103 such as the Internet.

Figure 2:
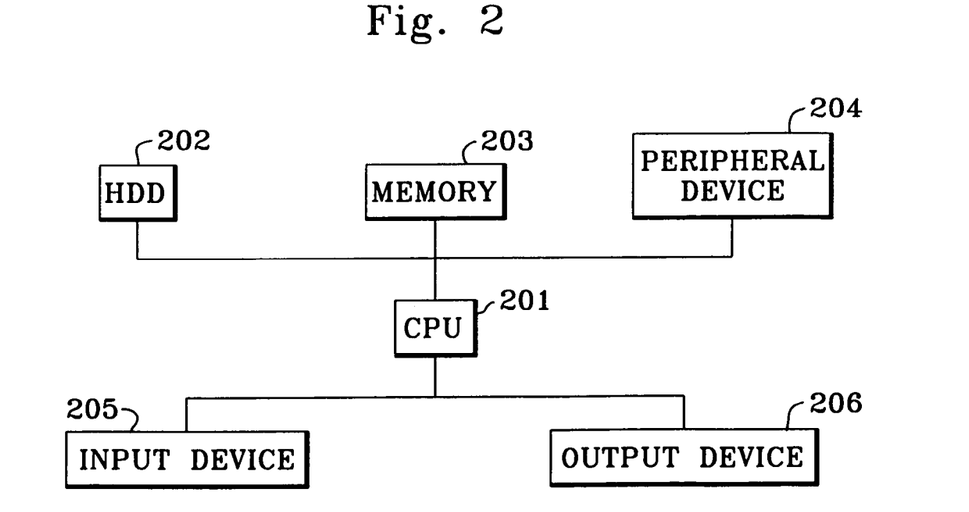
FIG. 2 is a block diagram of a computer in the system of FIG. 1.

FIG. 2 illustrates a hardware structure of the computer system 101. Notably, the computer system 101 includes a central processing unit 201 (CPU), a non-volatile storage device 202, a memory 203, a peripheral device 204, an input device 205, and an output device 206 (e.g., display device). The display device 206 may be a display device with a touch sensor, while the peripheral device 204 may include a CD-ROM drive, MO drive, FD drive, printer, modem or the like.

FIGS. 6A–6D show a first embodiment of the graphical user interface of the present invention.

According to a first aspect of the invention, a desired pop-up menu is displayed in accordance with the number of predetermined consecutive manipulations of the input device. This method of selecting a pop-up menu reduces the overall amount of movement or manipulation of the input device. The difference between the prior art and the method of selecting a pop-up menu according to the present invention will become evident from the following example.

FIG. 3 illustrates a pop-up menu 330 displayed when the input device is actuated by, for example, clicking a mouse button on a non-display area within an application program. The menu 330 includes seventeen individual menu items 312, e.g., underline, change font, insert figure, . . . exit. In order to select the "property" menu item 314, the user must drag the cursor down sixteen menu elements. Thus, the use of selecting of a menu item according to this example requires a relatively large effort by the user.

Figure 6A:
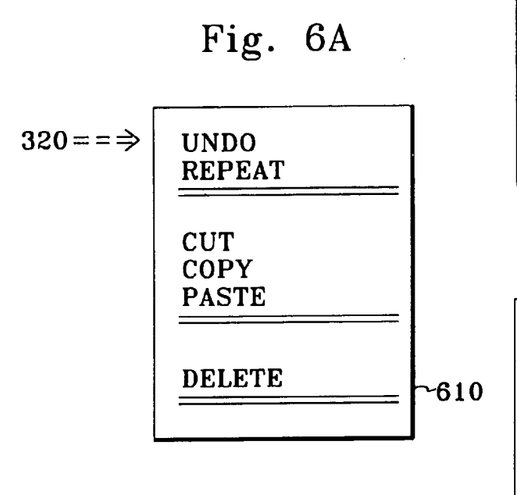
FIGS. 6A–6D show examples of graphical user interfaces according to the present invention.
Figure 6B:
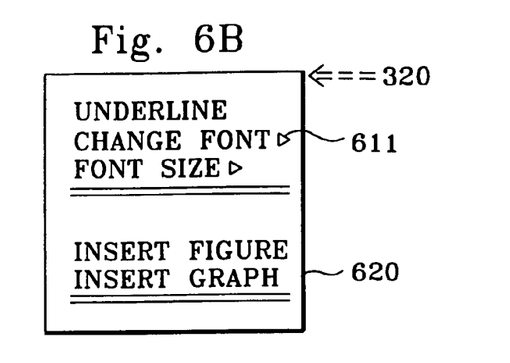
Figure 6C:
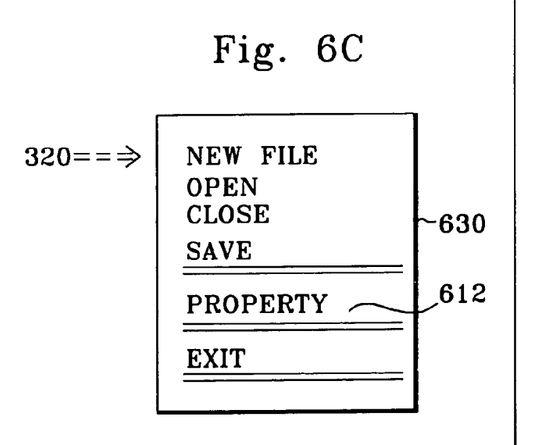

The present invention provides an approach to reduce the amount of movement of the input device. Notably, FIG. 6A illustrates a pop-up menu 610 displayed when a first-order event is generated by, for example, single-clicking the input device while positioning the cursor on the object/non-display area. Likewise, FIG. 6B illustrates a pop-up menu 620 displayed when a second-order event is generated by, for example, double-clicking the input device while positioning the cursor on the object/non-display area. As will be explained later in regard to FIG. 7, the second click point must satisfy a position validation condition or else an event counter will be reset and the first and second clicks will not be considered related events. Still further, FIG. 6C illustrates a pop-up menu 630 displayed when a third order event is generated by, for example, triple-clicking the input device while positioning the cursor on the object/non-display area. Again, the third click point must satisfy a position validation condition or else the event counter will be reset and the first, second and third click points will not be considered related events.

In order to select the "property" menu item 612 (FIG. 6C), the user activates the menu 630 by generating a third order event, e.g., triple-clicking the mouse button on a non-display area. In this manner, the user need only drag the cursor down no more than five menu elements. Thus, selecting a menu item according to the present invention enables a reduction in the overall amount of movement of the input device. Notably, the vertical displacement of the input device in this example was reduced by ⅔. In essence, the approach of the present invention enables the user to go directly to a given portion of a menu, thereby reducing the need to drag the cursor.

The items (commands) contained in the pop-up menu 610 may be segregated into a number of groups. For example, the items may be grouped by function. Thus, a "text editing" grouping may include items such as undo, repeat, cut, copy, paste, delete or the like. The pop-up menu of the present invention is capable of including a multiple hierarchical structure. For example, a mark 611 adjacent to a given menu item signals that there is a sub-menu for that item.

A further aspect of the present invention will be explained by reference to the following example. Assuming, for the sake of example, that N menus have been defined. The question arises as to which menu will be displayed if N+1 consecutive manipulations are detected. In other words, the system must determine which menu should be displayed when the detected number of manipulations exceeds the number of menus. According to this aspect of the present invention, the user specifies in advance a preference as to whether the first or the last menu will be displayed in response to an excessive number of consecutive manipulations.

A second embodiment of the graphical user interface of the present invention will be explained with reference to FIGS. 6A–6C. According to this embodiment, the menu displayed is determined in accordance with the length of time the input device is actuated rather than the number of consecutive manipulations detected.

By manner of illustration, the pop-up menu 610 is displayed when a given manipulation of the input device (event) occurs. This situation corresponds to the first-order event of the previous embodiment.

The menu 620 (FIG. 6B) corresponding to the second order event will be displayed if a predetermined mouse button is actuated continuously for a predetermined time, e.g., T seconds. Likewise, the menu 630 (FIG. 6C) corresponding to the third order event will be displayed if a predetermined mouse button is actuated continuously for a second predetermined time, e.g., 2T seconds. The only difference between this embodiment and the preceding embodiment is the method in which the event is signaled, i.e., number of actuations of the input device detected versus duration of a single actuation of the input device.

It should be noted that the period T may be set by the user. For example, the continuation period T can be set as 0.1 sec, 0.5 sec, 1 sec, 1.5 sec, etc.

One of ordinary skill in the art will appreciate that the above-described embodiments facilitate an advantageous reduction in the amount of manipulation of the input device according to the above described embodiment relative to a conventional GUI.

Figure 6D:
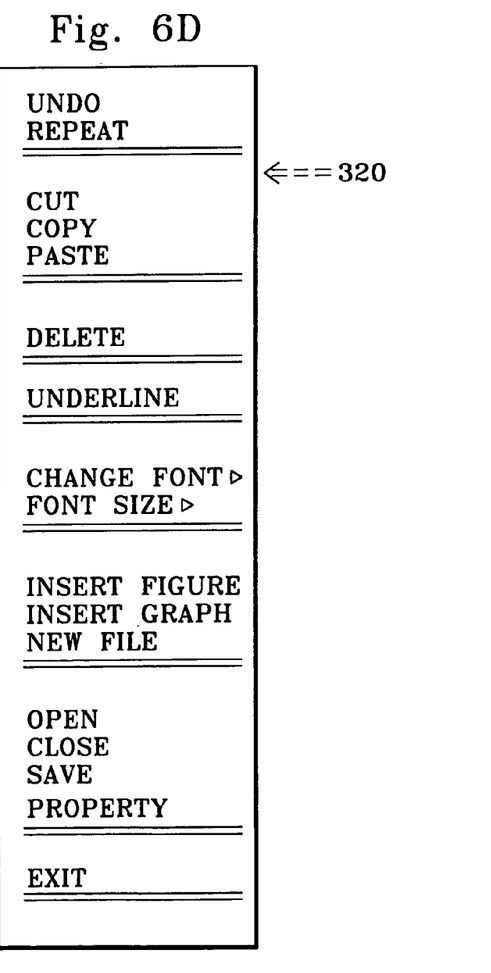

A further aspect of the invention will now be explained with reference to FIG. 6D.

This aspect of the invention relates to a variation of the above-described first and second embodiments in which the menu elements (commands) are grouped in a user-selectable grouping. According to this aspect of the invention, the cursor 320 is positioned over a given grouping in response to the number of actuations of the input device or the actuation duration time. Thus, the cursor is positioned in a first grouping upon detection of a first order event. Likewise, the cursor is positioned in a second grouping upon detection of a second order event, etc. In FIG. 6D, the cursor 320 is shown positioned in the second grouping.

Figure 7:
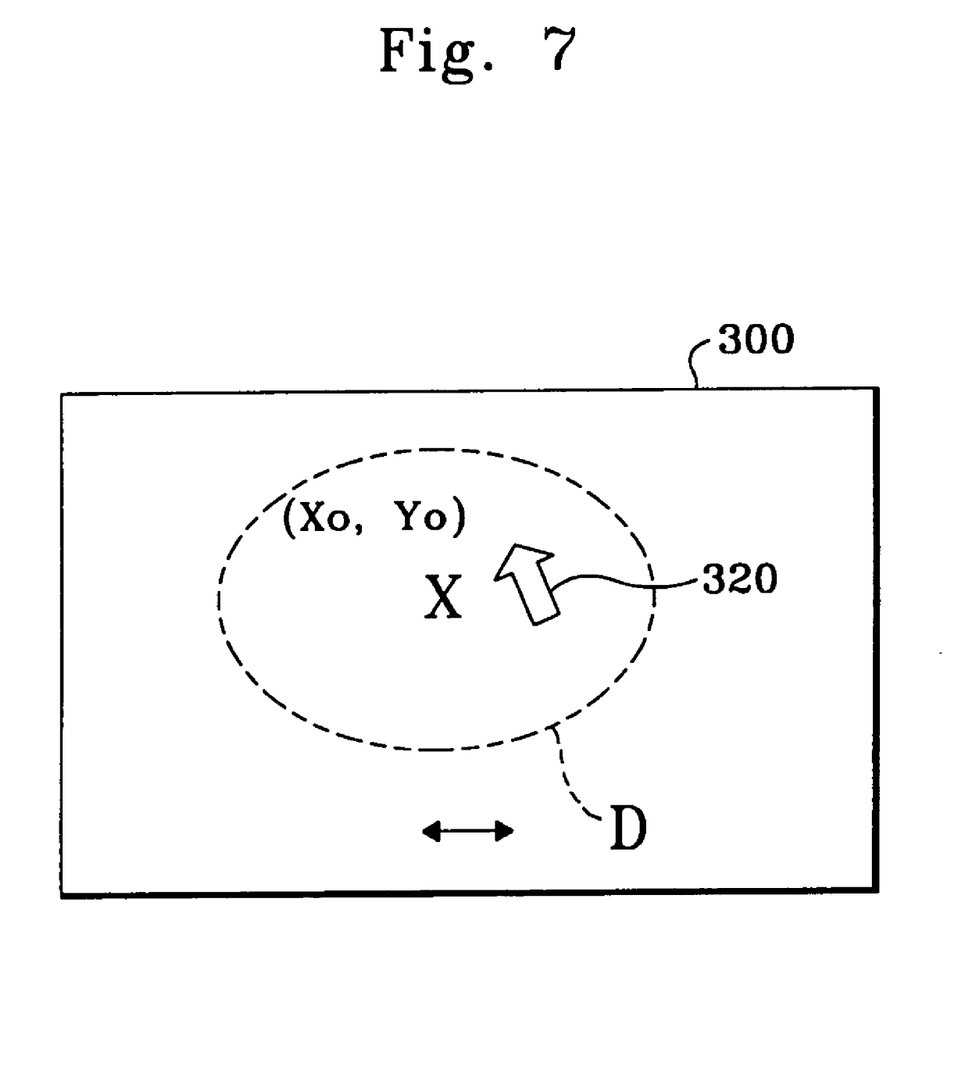
FIG. 7 is a diagram for explaining the position validation condition according to the present invention.

FIG. 7 is a diagram which is useful in understanding the position validation aspect of the invention.

As described above in reference to the first embodiment, the second-order event is triggered when two consecutive actuations of the input device are detected. However, according to one aspect of the invention, an event counter which counts the number of consecutive actuations will be reset (the first and second actuations will not be considered related events) unless the coordinates of the cursor during the second actuation is within a distance D from the location of the cursor during the first actuation (position validation condition satisfied). Likewise, the event counter will be reset (first, second and third actuations will not be considered related events) unless the coordinates of the cursor during the third actuation (the coordinates of the cursor) is within a distance D from the location of the cursor during the first actuation, etc. The position validation parameter D may be adjusted in accordance with the user's personal preferences.

The position validation condition is further applicable to the second embodiment of the invention. According to the second embodiment, the location of the pointing device (cursor) must be continuously maintained within a distance D of the initial coordinates of the pointing device for a predetermined duration in order to trigger an event. If the location of the cursor does not fall within a distance D then the position validation condition is not satisfied then an event timer which tracks the actuation duration time will be reset and no menu will be displayed. Again, the position validation parameter D may be adjusted in accordance with the user's personal preferences.

By manner of illustration, a non-display area 300 of a desktop is shown in FIG. 7. Cursor coordinates 320 denote the location of the cursor upon initial actuation of the input device. In order to satisfy the position validation condition, each subsequent actuation of the input device must fall within a distance D (denoted by the dashed circle) from the initial cursor coordinates 320.

Figure 8:
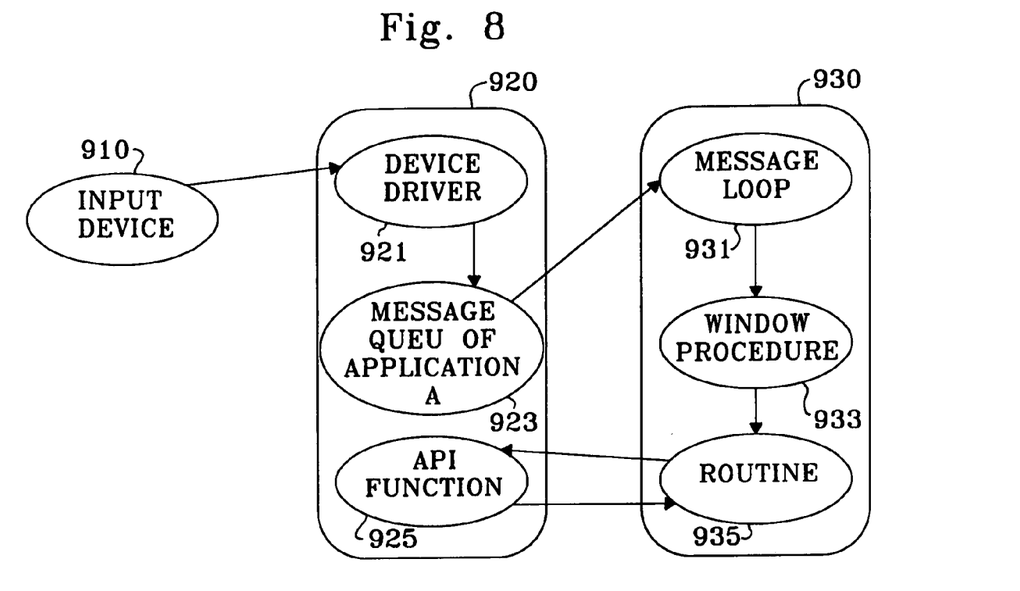
FIG. 8 shows the flow of messages between an Operating System and a software application embodying the present invention.

FIG. 8 is a block diagram illustrating an exchange of messages between an operating system OS 920 and an application program 930 when implementing the graphical user interface of the present invention in an application program. One of ordinary skill in the art will appreciate that the GUI of the present invention may be implemented within the OS in basically the same manner as the application program implementation. Therefore, an explanation of the implementation of the graphical user interface of the present invention in operating system OS 920 will be omitted.

Upon initial execution, the application program 930 requests the OS 920 to monitor an input device 910 for the occurrence of a particular event (manipulation of the input device or actuation thereof for a predetermined time). The occurrence of a predetermined manipulation of the input device 910 is detected by a device driver 921. The device driver 921 queues a message to notify generation of the relevant event in a message queue 923, which in turn relays the message to a message loop 931 (receiving means) in the application program 930.

Assume, for the sake of illustration, that the input device 910 is a mouse having left and right push-buttons, and the operating system 920 is MS Windows. According to this example, when the event detected by the device driver 921 is the (downward) actuation of the right mouse button, the message transmitted is WM-RBUTTONDOWN, and when the detected event is the (upward) release of the right mouse button, the message transmitted to the message loop 931 is WM-RBUTTONUP. Similarly, when the detected event is the (downward) actuation of the left mouse button, the message transmitted is WM-LBUTTONDOWN, and when the detected event is the (upward) release of the left button, the message transmitted is WM-LBUTTONUP.

Still further, when the detected event is a continued actuation of a menu display key, the message transmitted is WM-CONTEXTMENU. Moreover, when the detected event is the actuation of an ordinary key down, the message transmitted is WM-KEYDOWN, and when the detected event is the release of the ordinary key, the message transmitted is WM-KEYUP. In addition, when the detected event is the actuation of a particular key, the message transmitted is WM-CHAR for storing the character code of the particular key. In the following explanation, a message corresponding to each event is written in summary as WM-XXX.

Upon reception of the message WM-XXX, the message loop 931 judges the message to determine an appropriate course of action. Importantly, the message loop 931 must determine whether the position validation condition (explained above with reference to FIG. 8) is satisfied. Thus the appropriate course of action is determined on the basis of the message type in conjunction with the position validation condition result. If the position validation condition is satisfied, a window procedure 933 (display control means) displays the contents of a resource file 1600 (see, e.g., FIG. 14A) or a data file 1710 as the menu on the desktop.

The location, i.e., coordinates of the click point (of the pointing device) are needed to determine whether the position validation condition is satisfied. These coordinates (xPos, yPos) are stored in the argument IParam together with the message WM-MOUSEMOVE. Notably, the message WM-MOUSEMOVE (and its argument IParam) is transmitted each time the cursor is moved. If the cursor is moved while the pointing device (mouse) is captured, i.e., while one of the push buttons is actuated, the message WM-MOUSEMOVE is sent to the window procedure 933.

As previous described, a resource file 1600 or a data file 1710 (management means) contains a list of items to be displayed for a given menu. See, e.g., FIGS. 13A and 13B. Prior to switching between menus, the currently displayed menu is cleared (destroyed) when the Windows application program interface (API) function 925 (FIG. 8) issues a DestroyMenu command. Subsequently, the next menu is generated when the API function 925 issues a CreatePopupMenu, and the content of the resource file defining the next menu is displayed when the Windows API function 925 issues the command TrackPopupMenu.

Figure 9:
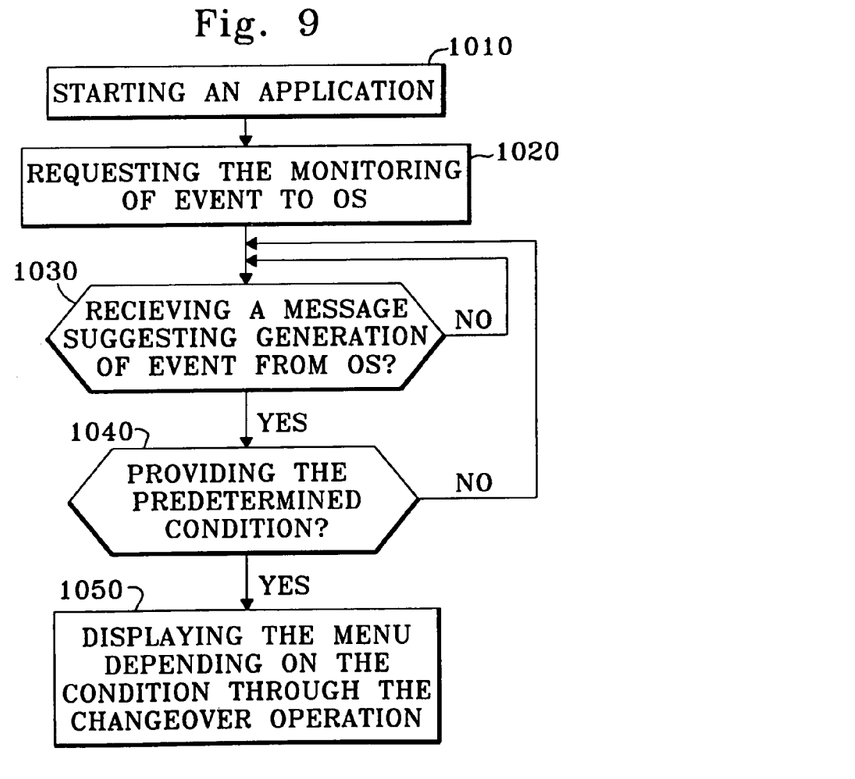
FIG. 9 is a flowchart of providing an overview of software for the present invention.

FIG. 9 is a flowchart briefly illustrating operations of the application program 930 embodying the GUI of the present invention. First, in the step 1010, a user activates the application program 930 by, for example, actuating the left mouse button on an object (icon).

Next, in the step 1020, the software of the present invention 930 requests the monitoring of the input device (mouse) by the OS 920.

Next, in the step 1030, the message loop 931 of the application program 930 judges whether a message regarding generation of the relevant event has been received from OS 920. Processing proceeds to the step 1140 when it is judged that the received message WM-XXX has a predetermined value.

Next, in the step 1040, the window procedure 933 judges whether the position validation condition is satisfied. If the event does not satisfy the condition, processing reverts back to the step 1030, and if event satisfies the condition, processing continues to the step 1050.

Next, in the step 1050, the software 930 of the present invention displays the selected menu on the desktop as illustrated in FIGS. 6A–6C on the basis of the number actuations or the actuation time of the input device.

Figure 10:
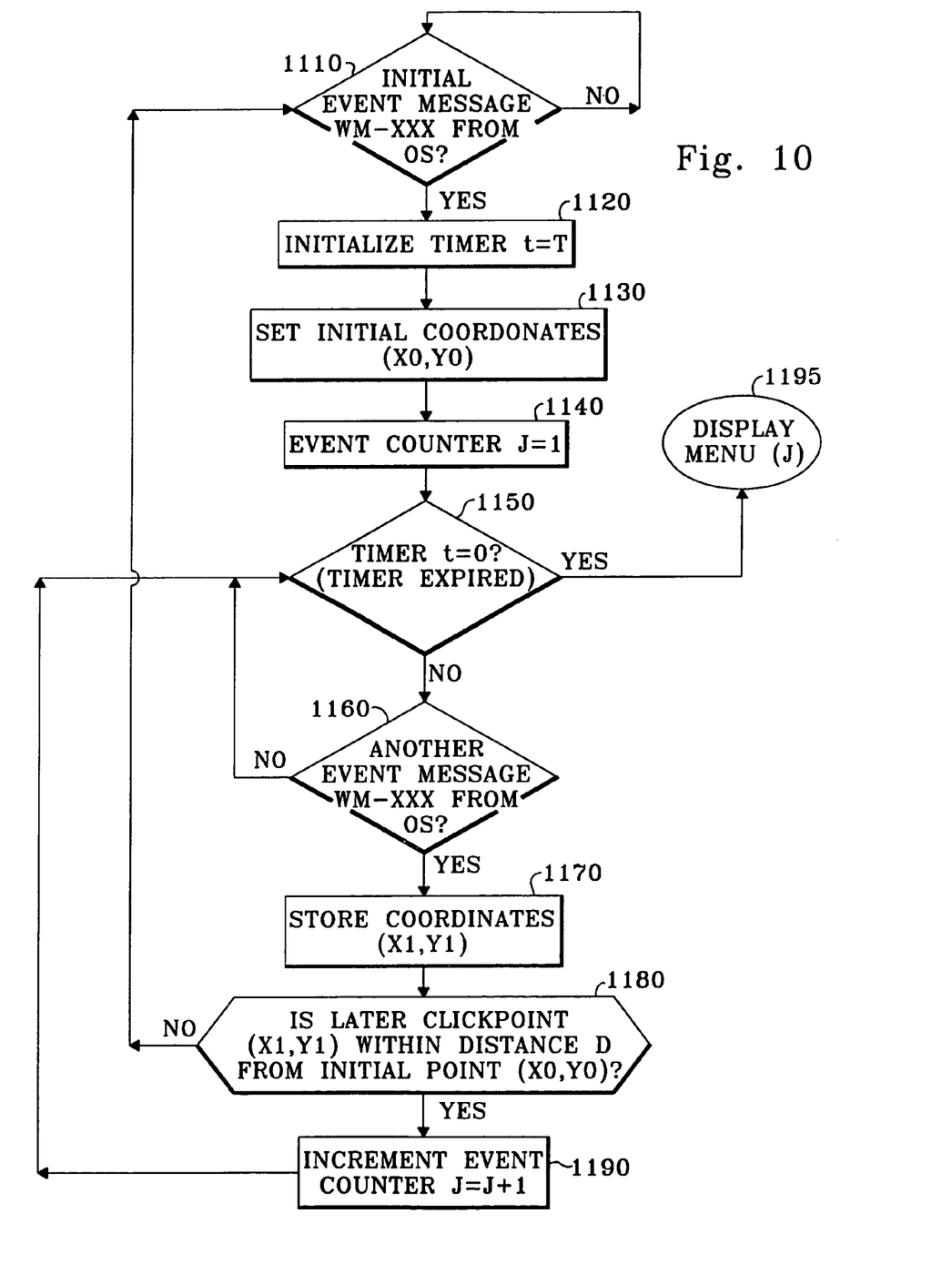
FIG. 10 is a flowchart of GUI software according to the first embodiment.
Figure 11:
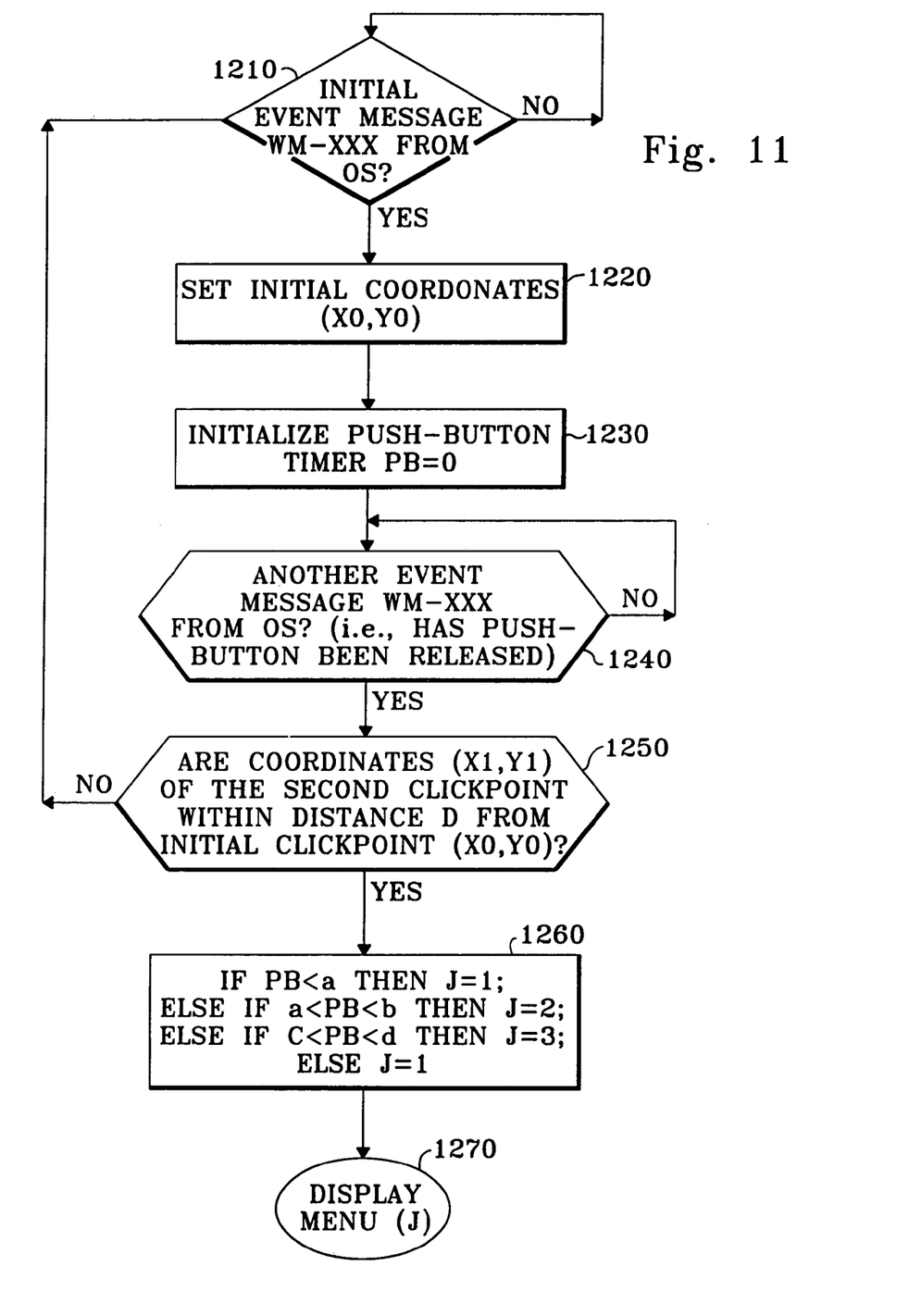
FIG. 11 is a flowchart of GUI software according to the second embodiment.

FIGS. 10 and 11 are flowcharts illustrating further details of steps 1030 to 1040 of FIG. 9. In particular, the flowchart of FIG. 10 pertains to the first embodiment wherein the menu is selected on the basis of the number of consecutive actuations of the input device in a predetermined time interval. The flowchart of FIG. 11 pertains to the second embodiment wherein the menu is selected on the basis of a duration time of a predetermined actuation of the input device.

Turning to FIG. 10 (and FIG. 8), in step 1110, the message loop 931 of the software 930 of the present invention judges whether a message WM-XXX signifying the occurrence of an event has been received. Upon judging the occurrence of an event, the message loop 931 calls the window procedure 933, and processing proceeds to step 1120. The window procedure 933 obtains the coordinates (X, Y) of the cursor on the desktop, together with the relevant message, and transmits the message and coordinates to the routine 935.

In step 1120, the routine 935 initializes the event timer to a predefined value and begins incrementing/decrementing the timer.

Next in step 1130, the coordinates obtained in the step 1110 are stored as reference center coordinates (X0, Y0).

In step 1140, the event counter J is initialized to 1, and processing proceeds to step 1150, where the event timer is interrogated to determine whether it has expired. If the event timer has not expired then processing continues to step 1160, whereas if the event timer has expired then processing continues to step 1195.

In step 1160, the message loop 931 again judges whether a message WM-XXX signifying the occurrence of an event has been received. Upon judging the occurrence of an event, the message loop 931 calls the window procedure 933.

Next, in step 1170, the coordinates (X1, Y1) of the subsequent event are stored. In step 1180, a determination is made as to whether the coordinates (X1, Y1) are within distance D from reference center coordinates (X0, Y0), i.e., whether the position validation condition is satisfied. If not, processing branches back to the step 1110. On the other hand, if the position validation condition is satisfied, processing continues to the step 1190 and the event counter is incremented by one.

Finally, in step 1195, menu(J) is displayed upon expiration of the event timer, where J reflects the number of consecutive actuations of the input device.

Turning to FIG. 11, the method of the second embodiment of the invention wherein the menu is selected on the basis of a duration time of a predetermined actuation of the input device will be explained.

In step 1210, the message loop 931 judges whether a message WM-XXX signifying the occurrence of an event has been received. Upon judging the occurrence of an event, the message loop 931 calls the window procedure 933. The window procedure 933 obtains the coordinates (X, Y) of the cursor on the desktop, together with the relevant message, and transmits the message and coordinates to the routine 935.

In step 1220, the routine 935 sets the coordinates obtained in step 1210 as the reference center coordinates (X0, Y0). Next, in step 1230, the routine 935 starts the push-button timer for monitoring an event to be conducted in succession or in continuation.

In step 1240, the message loop 931 again judges whether a message WM-XXX signifying the occurrence of an event has been received.

Next, in step 1250, the routine 935 judges whether the coordinates (X1, Y 1) when the subsequent event is generated are within distance D from reference center coordinates (X0, Y0), i.e., whether the position validation condition is satisfied. If not, processing branches to the step 1210. On the other hand, if the position validation condition is satisfied, processing continues to step 1260.

In steps 1260 and 1270, the appropriate menu is selected in correspondence to the elapsed time (event duration) between receipt of the first and second event messages.

Figure 12A:
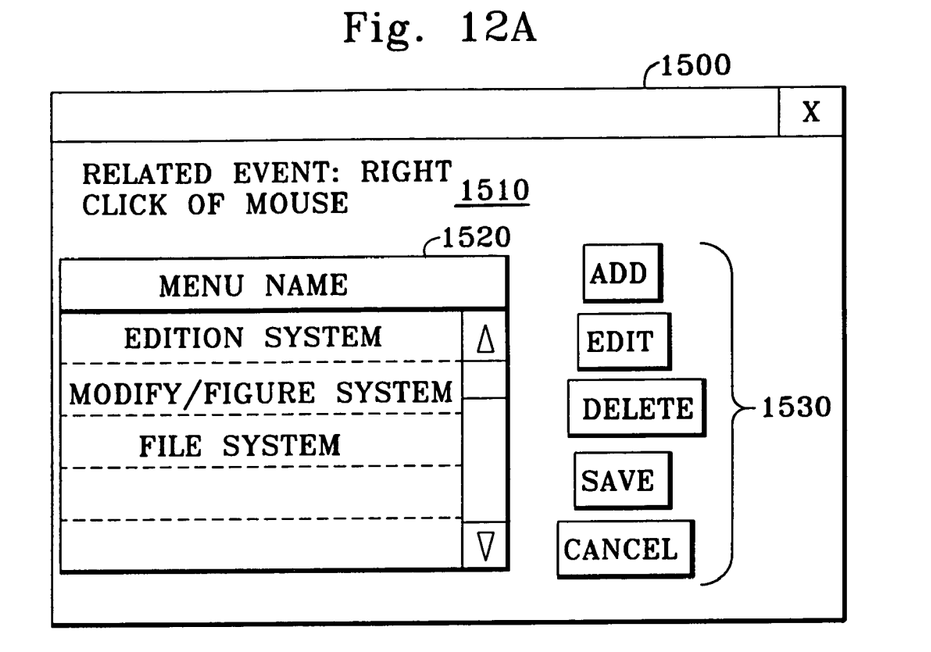
FIGS. 12A and 12B are sample user interfaces for selecting and ordering the items displayed in a menu.
Figure 12B:
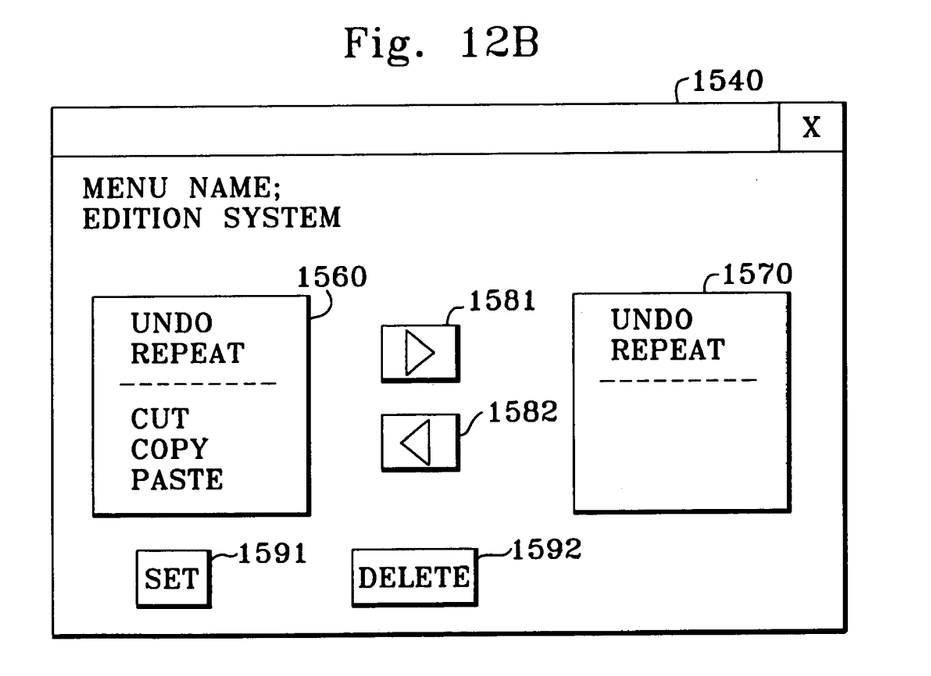

As described above, the contents of each of the menus of the present invention may be configured by the user. Notably, each menu may be customized by editing the resource file which determines the content of the menu. See, e.g. FIG. 13A. One of ordinary skill in the art will appreciate the numerous different ways in which modification of the resource file may be performed. One such way of modifying the resource files is by way of the user interfaces 1500 and 1540 shown in FIGS. 12A and 12B.

One of ordinary skill in the art will appreciate how to construct such a user interface from the following brief description of its functionality. The interface 1500 (FIG. 12A) includes a description 1510 of the event which triggers the display of a menu 1520. For example, the event description could read "single click of right mouse button." Buttons 1530 enable the user to add, edit, or delete any of items associated with a given menu 1520. The interface 1540 (FIG. 12B) is used to re-order the items of a selected menu. In other words, interface 1540 enables the user to modify the sequence in which items in each menu are displayed. Window 1560 reflects the current (default) order of the menu items and window 1570 reflects the newly defined order. The user re-orders the items using arrows 1581, 1582, and either saves the order by clicking on the set button 1591 or cancels using cancel button 1592.

Figure 13A:
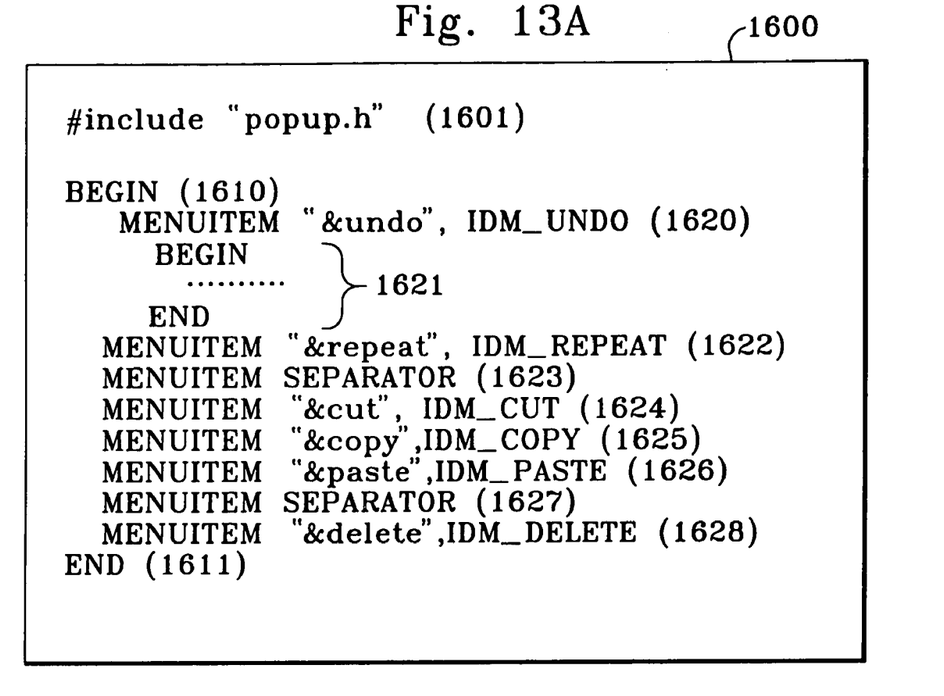
FIG. 13A shows an example of a resource file used to define the items included in a menu grouping.
Figure 13B:
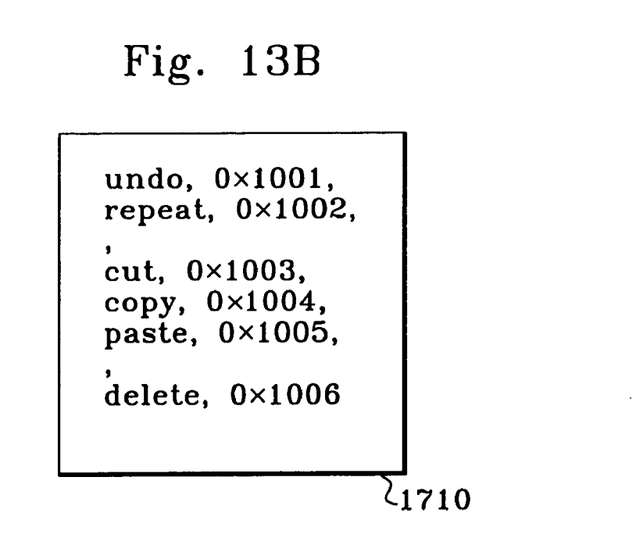
FIG. 13B shows an example of a data file used to define the items included in a menu grouping.

FIG. 13A shows sample resource files 1600 such as used by the GUI of the present invention, and which may be modified using the interface 1540. Similarly, FIG. 13B shows a sample data file 1710 which may be used in place of resource file 1600. One of ordinary skill in the art will readily appreciate that the only difference between the resource file 1600 and data file 1710 is the data structure utilized. Notably, the resource file 1600 incorporates a higher level structure than the data file 1710. Moreover, one of ordinary skill in the art will appreciate that either file structure (resource file 1600 or data file 1710) may be edited using interfaces such as the ones shown in FIGS. 12A and 12B.

Resource file 1600 contains an include statement 1601 which calls a header file popup.h. BEGIN statement 1610 declares the start of the item to be displayed in the pop-up menu, while the END statement 1611 declares the end of such item.

Each item to be displayed in the pop-up menu is defined in the MENUITEM statements 1620, 1622 to 1628. In the example shown, each character string enclosed by the double quotations (" ") after the MENUITEM statement is displayed in the pop-up menu, e.g. "&undo".

The statements 1623, 1627 designate entry of a separator which is interposed between menu items. For example, in FIG. 6A, the separator is shown as a series of dashes "======".

Block 1621 (FIG. 13A) is used to define the hierarchical structure of a sub-menu. Moreover, as previously described, menu items having a sub-menu include a mark 611 (FIG. 6B). One of ordinary skill in the art will appreciate that any number of sub-menus may be defined using a series of blocks 1621, and that sub-sub-menus and the like may be created using a series of nested blocks 1621.

Moreover, one of ordinary skill in the art will appreciate that the registry used in MS Windows 95 or MS Windows 98 may be employed in place of the resource file 1600.

In this case, the menus of each hierarchical structure are defined under the registry file HKEY-LOCAL-MACHINE-SOFTWARECOMPANY-APOPUP. For example, the menu corresponding to FIG. 6A may be defined in the registry file referred by the registry key HKEY-LOCAL-MACHINE-SOFTWARECOMPANY-APOPUPMENU1.

Each menu item defined in these registry files allows reference to the value thereof depending on the registry key. Reference to these key values is achieved by way of a registry function, such as registry file open RegOpenKeyEx( ), registry key value read RegQueryValueEx( ) and registry file close RegCloseKey( ). Thus, for example, when menu item "undo" of FIG. 6A is selected, a value of registry key HKEY-LOCAL-MACHINE-SOFTWARECOMPANY-APOPUPMENU11 is stored in WM-COMMAND.

According to another aspect of the invention, the method of displaying and selecting menu items is embodied in software stored on a computer readable storage medium. The software interacts with the operating system, which communicates event alert messages upon a particular manipulation of an input device.

Included in the software is a first routine which receives the event alert messages from the operating system. The first routine monitors at least one of the number of event alert messages received in a predetermined time interval, and an alert event duration time. The event alert duration time represents the time period in which a given manipulation of the input device occurred. For example, the event alert duration time could represent the amount of time a given mouse button was actuated.

The event alert duration time could be calculated within the operating system. Alternatively, the event alert duration time could be calculated as a difference between receipt of a first event alert message and receipt of a second event alert message.

The first routine interacts with a second routine which displays a selected menu on the basis of one of: the number of event alert message received within a predetermined time interval, and the event alert duration time.

According to one enhancement, the software further includes a menu item manager for selecting and arranging items displayed in each one of a plurality of menus.

According to another enhancement, the software includes a coordinate monitoring routine which monitors the coordinates of each clickpoint and resets at least one of an event counter and an event timer upon receiving an event alert message having invalid coordinates. Notably, a location parameter IParam is transmitted with each event alert message. The location parameter IParam includes coordinates of a cursor corresponding to a position of the input device.

The coordinate monitoring routine verifies whether a difference between the coordinates of a first IParam and a second IParam is within a predefined distance D. Notably, the event alert timer which tracks the actuation duration time is reset to zero if the difference is greater than the predefined distance D. Similarly, the event alert counter which counts the number of event alert messages received in a predetermined time interval is reset to zero when the difference is greater than the predefined distance D.

As is apparent from the above explanation, the user customizable menu system of the present invention reduces the amount of user manipulation of an input device required to select a give menu item.

While the principles of the invention have been described above in connection with specific embodiments, it is to be understood that this description is made only by way of example and not as a limitation on the scope of the invention.

What is claimed is:

1. A graphical user interface for displaying a menu on a display screen on the basis of a predefined manipulation of an input device, comprising:
   input device monitoring means for monitoring at least one of a location and an actuation state of the input device;
   cursor display control means for displaying a cursor on the display screen based on location information from the input device monitoring means; and
   menu display control means for selecting and displaying on the display screen a single menu of a plurality of menus, at a same location as the cursor on the display screen, and on the basis of at least one of:
   a number of consecutive actuations of the same input device in a predetermined time interval for the cursor located at a single location on the display screen; and
   a duration time of an actuation of the same input device for the cursor located at a single location on the display screen.

2. A graphical user interface for displaying a menu on a display screen based on a predefined manipulation of an input device, comprising:
   menu item management means for selecting and arranging items displayed in each menu of a plurality of menus;
   receiving means for receiving an event alert message responsive to a predefined manipulation of the input device;
   cursor display control means for displaying a cursor on the display screen based on location information from the input device, and
   menu display control means for displaying a selected one of said plurality of menus at a same location on the display screen as said cursor based on a predefined number of said event alert messages that are received within a predetermined time interval,
   wherein said menu display control means includes at least one of an event alert counter and an event alert timer,
   wherein said event alert counter counts a number of said event alert messages received for said cursor located at a single location on the display screen, and
   wherein said event alert timer times a duration time of an actuation of the input device for said cursor located at a single location on the display screen.

3. A graphical user interface according to claim 2,
   wherein a cursor location parameter IParam, corresponding to said location information from the input device, is transmitted with each said event alert message,
   wherein said display control means verifies whether a difference between a first IParam, corresponding to a location of said cursor on the display screen when a first event alert message is generated, is within a predefined distance D of a second IParam corresponding to a location of said cursor on the display screen when a second event alert message is generated,
   wherein said event alert counter and said event alert timer are reset to zero and said first and second event alert messages are not considered related events if said difference exceeds said predefined distance D, and
   wherein said cursor is determined to be at said same location on the display screen when said difference does not exceed said predefined distance D.

4. A graphical user interface for displaying a menu on a display screen and positioning a cursor on a particular portion of the menu based on a predefined manipulation of an input device, the menu including a plurality of menu elements or commands which are grouped in a predefined manner, the graphical user interface comprising:
   input device monitoring means for monitoring at least one of a location information from and an actuation state of the input device;
   cursor display control means for displaying the cursor based on the location information from the input device; and
   menu display control means for displaying the menu at a same location on the display screen as the cursor in response to a first actuation of the input device, the menu being divided into a predetermined number of regions, each of said regions corresponding to a particular group of the plurality of menu elements;
   wherein said cursor display control means positions the cursor on a selected region of said predetermined number of regions of the menu based on at least one of:
   a number of consecutive actuations of the input device in a predetermined time interval for the cursor located at a single location on the display screen; and
   a duration time of an actuation of the input device for the cursor located at a single location on the display screen.

5. A graphical user interface according to claim 4,
   wherein said input device monitoring means receives predefined event alert messages in response to a predefined manipulation of the input device; and
   wherein said cursor display control means positions the cursor on said selected region of the menu based on a predefined number of event alert messages received within said predetermined time interval.

6. A graphical user interface according to claim 5, wherein a cursor location parameter IParam, corresponding to said location information from the input device, is transmitted with each said event alert message, wherein said display control means includes at least one of an event alert counter and an event alert timer, said event alert counter counting a number of event alert messages received for the cursor at said single location, and said event alert timer timing a duration time of said actuation of the input device for the cursor at said single location, wherein said display control means verifies whether a difference between a first IParam, corresponding to a location of the cursor when a first event alert message is generated, is within a predefined distance D of a second IParam corresponding to a location of the cursor when a second event alert message is generated, wherein said event alert counter and said event alert timer are reset to zero and said first and second event alert messages are not considered related events if said difference exceeds said predefined distance D, and wherein said cursor is determined to be at said same location on the display screen when said difference does not exceed said predefined distance D.

7. A computer system for displaying a selected menu of a plurality of menus on a display screen based on a manipulation of an input device, comprising:

receiving means for receiving an event alert message from an operating system, said event alert message alerting said receiving means to an occurrence of a particular manipulation of the input device;

cursor display control means for displaying a cursor on the display screen based on location information from the input device; and menu display control means for displaying the selected menu at a same location on the display screen as said cursor based on at least one of:

a duration time of said particular manipulation calculated as a time difference between receipt of a first event alert message and receipt of a second event alert message for said cursor located at a single location on the display screen; and a number of event alert messages received in a predetermined time interval for said cursor located at a single location on the display screen.

8. A computer system according to claim 7, further comprising menu item management means for selecting and arranging items displayed in each menu of the plurality of menus.

9. A computer system according to claim 7, wherein a cursor location parameter IParam is transmitted with each of said first and second event alert messages, said cursor location parameter IParam including coordinates of said cursor during generation of an event alert message, wherein said display control means includes at least one of an event alert counter and an event alert timer, said event alert counter counting a number of event alert messages received, and said event alert timer timing a duration time of an actuation of the input device, said display control means verifies whether a difference between a first IParam, corresponding to a location of said cursor on the display screen when said first event alert message is generated, is within a predefined distance D of a second IParam corresponding to a location of said cursor on the display screen when said second event alert message is generated, wherein said event alert counter and said event alert timer are reset to zero and said first and second event alert messages are not considered related events if said difference exceeds said predefined distance D, and wherein said cursor is determined to be at said same location on the display screen when said difference does not exceed said predefined distance D.

10. A computer readable storage medium storing a computer program for displaying a selected menu of a plurality of menus on a display screen of a computer based on a manipulation of an input device, comprising:

program code means responsive to an event alert message from an operating system of the computer upon a particular manipulation of the input device;

cursor display control means for displaying a cursor on the display screen based on location information from the input device; and program code means for displaying the selected menu at a same location on the display screen as said cursor based on at least one of:

a number of event alert messages received within a predetermined time interval for said cursor at said same location; and a duration time corresponding to an actuation of the input device calculated as a difference between receipt of a first event alert message and receipt of a second event alert message for said cursor at said same location.

11. A computer readable storage medium according to claim 10, wherein said computer program further comprises menu item management means for selecting and arranging items displayed in each one of the plurality of menus.

12. A computer readable storage medium according to claim 10, wherein a cursor location parameter IParam is transmitted with each of said first and second event alert messages, said location parameter IParam includes location coordinates of said cursor corresponding to said location information from the input device, wherein said display control means includes at least one of an event alert counter and an event alert timer, said event alert counter counting a number of event alert messages received, and said event alert timer timing a duration time of said actuation of the input device, wherein said display control means verifies whether a difference between a first IParam, corresponding to a location of said cursor when said first event alert message is generated, is within a predefined distance D of a second IParam corresponding to a location of said cursor when said second event alert message is generated, wherein said event alert counter and said event alert timer are reset to zero and said first and second event alert messages are not considered related events if said difference exceeds said predefined distance D, and wherein said cursor is determined to be at said same location when said difference does not exceed said predefined distance D.

* * * * *